Figure 1:
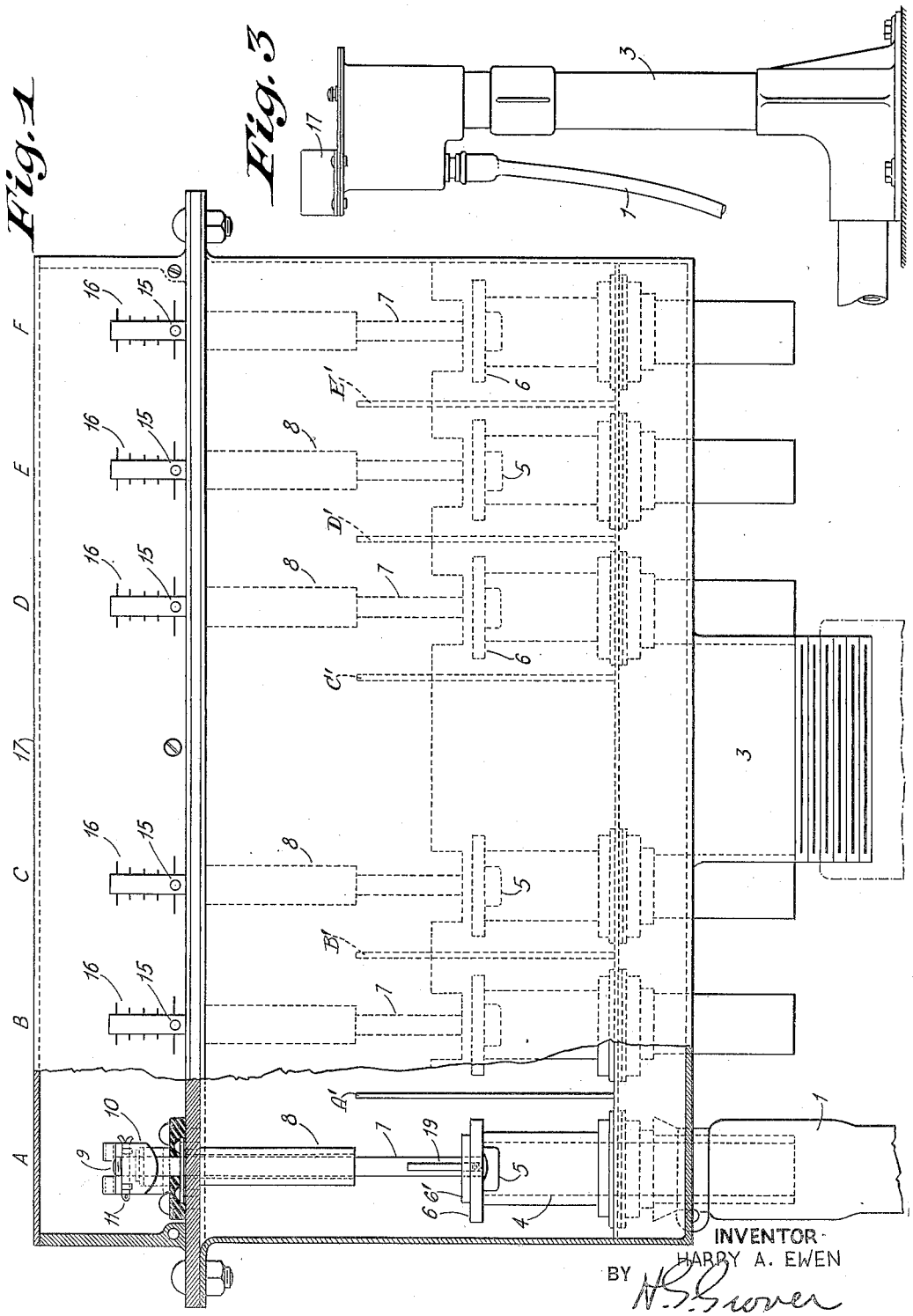

Nov. 3, 1936.　　　　H. A. EWEN　　　　2,059,782
LIQUID FLOW OPERATED SAFETY OR INDICATING DEVICE
Filed March 22, 1933　　2 Sheets-Sheet 1

INVENTOR
HARRY A. EWEN
BY N.S. Grover
ATTORNEY

Nov. 3, 1936.    H. A. EWEN    2,059,782
LIQUID FLOW OPERATED SAFETY OR INDICATING DEVICE
Filed March 22, 1933    2 Sheets-Sheet 2

INVENTOR
HARRY A. EWEN
BY H. S. Grover
ATTORNEY

Patented Nov. 3, 1936

2,059,782

UNITED STATES PATENT OFFICE 2,059,782

LIQUID FLOW OPERATED SAFETY OR INDICATING DEVICE

Harry Alexander Ewen, Shenfield, England, assignor to Radio Corporation of America, a corporation of Delaware Application March 22, 1933, Serial No. 662,120
In Great Britain March 23, 1932

5 Claims. (Cl. 200—81)

This invention relates to liquid flow operated safety or indicating devices.

There are many known devices which for proper operation require a flow of liquid to be maintained in a predetermined liquid circuit: for example, there are many cases in which for proper and safe operation of apparatus a flow of cooling water must be maintained, and in such cases it is frequently desirable or necessary to provide means which shall be operated automatically should the flow of liquid fail so as to prevent damage to the apparatus to the proper functioning of which the liquid flow is necessary. There are many known forms of such automatically operated devices for giving protection should the flow of liquid fail and in general such devices include a float or other movable obstruction positioned in one of the delivery pipes associated with the apparatus through which the liquid is required to flow, this float or other movable obstruction being held in one position as long as the flow continues properly, but being allowed to move into another should the flow fail, this latter movement generally actuating a switch which performs desired circuit changes to switch off or otherwise protect the apparatus in question. Devices of this kind are found in practice to present the serious disadvantage of lack of reliability in some circumstances, and, where the cooling water contains lime or other ingredients likely to lead to corrosion (a usual case) it may happen, after such a device has been in use for some time, that the corrosion may render the device inoperative.

The principal object of the present invention is to provide a liquid flow operated safety or indicating device in which those difficulties shall be removed, and which shall be simple in construction and reliable in operation.

According to the present invention a liquid flow actuated safety or indicating device comprises a weir, baffle plate, or equivalent member situated at or near the outlet end of the fluid flow system so that the liquid must flow over or through the said weir or its equivalent to leave the system, and a flow actuated member movably mounted in association with said weir or its equivalent, and so arranged that should the flow of liquid fail the flow actuated member moves into a position in which it performs the necessary operation to protect the apparatus to be protected against failure of liquid flow. The flow actuated member is so arranged as never completely to obstruct the flow of fluid.

As will be seen the present invention possesses the operating feature, which contributes largely to the good reliability obtained, that the delivery pipe is not obstructed by any device being placed in it, the operation depending upon a baffle plate mounted opposite the open end of the pipe. This plate is cut away to permit always of a certain minimum flow when the safety or like device is actuated or if the flow actuated member should stick.

Although the invention is not limited to its application thereto it is particularly well adapted for use in connection with liquid cooled thermionic valves. In such an application the liquid flow operated member is arranged to actuate a switch to switch off the valve or valves to be protected should the flow fail.

Figure 2:
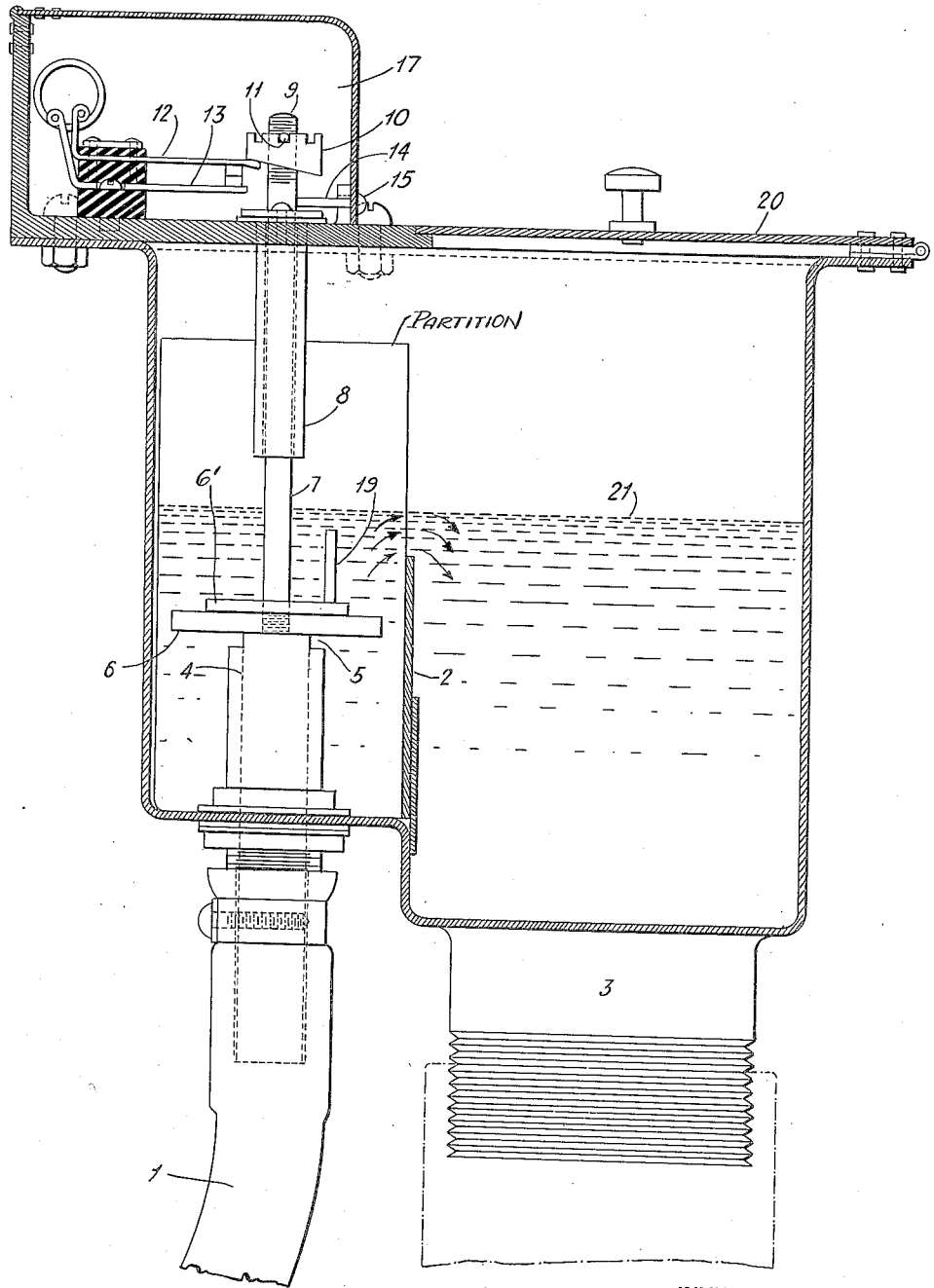

The invention is illustrated in the drawings accompanying the specification wherein Figure 1 shows in front elevation and partly in section an arrangement comprising a plurality of liquid flow operated safety devices mounted side by side in a single casing, while Figure 2 is a sectional view taken at right angles to Figure 1. Figure 3 is a view taken in the same direction as Figure 2 but to a reduced scale and showing the general exterior appearance of the apparatus.

Referring to the drawings, each of the liquid flow actuated safety devices therein comprised is indicated generally by the letter A, B, C, D, E, or F, said devices being mounted side by side in a single casing or enclosing chamber but operatively divided from one another by suitable partitions A', B', C', D' and E'. Cooling liquid, for example water from the anode or anodes of a water cooled thermionic valve or valves to be protected, is led through the pipe 1 into the safety device whence it flows over the weir 2 and out to a waste sump through a pipe 3 which also serves to form part of a supporting bracket by which the apparatus is carried as shown in Figure 3. The pipe 1 leads into a pipe 4 which is cut away as shown at 5 and over which is mounted a flow actuated plate 6 carried upon a shaft or spindle 7 which is slidably mounted in a guide tube 8. The shaft or spindle 7 terminates in a screwed portion 9 upon which is screwed a castellated nut 10 having its lower face cut away at an angle as shown in Figure 2, said nut being held in a desired position of adjustment by means of a split pin 11. When the parts are in the position as shown in Figure 2 the nut 10 bears down upon a spring blade 12 and thereby closes a switch constituted by a contact carried by the blade 12 and a cooperating contact carried by a fixed blade 13. This switch is included for example in an essential power supply circuit of the valve or valves to be protected. The nut 10 is provided with the inclined lower face, as shown, to facilitate adjustment since by rotating the nut upon the screwed spindle a fairly wide range of adjustment can be obtained since, of course, one side of the lower face of the nut is lower than the other. Carried upon the spindle 7 is a member 14 which is formed at its end 15 to act as an indicator cooperating with a scale 16 constituted by markings placed opposite the edges of a slot in the top cover or casing 17. Upward movement of the member 6 is limited by means of member 14 and the slot in cover 17. An upstanding pin 19 is carried by member 6 which retains in position the adjustment disc 6'. These adjustment discs are in the form of sheets of lead, their number and weight being determined by the pressure of the liquid flow to be controlled. A cover 20 extending the whole length across the top of the sump tank and is removable for inspection. The whole apparatus is designed to work with the plate 6 in a submerged or semi-submerged condition, the normal water level when the apparatus is functioning normally being as indicated by the broken line 21. The weir 2 has a larger cross-sectional area than the plate-like member 6. The weir 2 is in fact a series of weirs, one being provided between the partitions A', B', C', D', E'. The effect of the weir plate 2 is to insure that the indicator plate 6 is being operated in a floating condition, and also the fact that the water from each inflow pipe 1 is forced to flow over the weir, providing a sufficiently accurate gauge of the quantity of water flowing between each of the partition plates. Therefore, by lifting the lid 20 a casual inspection of the row of the weirs will indicate if all the outflow pipes are delivering approximately the same quantity of water, i. e., the weir actually functioning as a weir, and is therefore used to indicate the quantity of the water flowing. In these circumstances the member 6 is held up from the end of the pipe 4 by the action of the water flowing over the weir 2 and so long as the member 6 is held higher than in the position shown in Figure 2, the nut 10 is held away from the spring switch blade 12, and the switch 12, 13 is consequently held open. Should the liquid flow fail, the member 6 returns under gravity to the position shown in Figure 2, the nut 10 closes the switch contact members 12—13, and the valves to be protected are switched off.

While the apparatus is in operation the indicator 15 in cooperation with the scale 16 indicates approximately the rate of liquid flow.

It will be noted that with arrangements in accordance with this invention when the safety device is in normal operation i. e. when correct liquid flow is taking place, there is substantially no obstruction in the flow of liquid, while the apparatus is substantially free from liability to be rendered inoperative by effects of corrosion. The arrangement whereby the apparatus is caused to operate normally in a partially flooded condition is also of considerable advantage inasmuch as aeration of the liquid is to a large extent avoided.

Having now particularly described and ascertained the nature of my said invention and in what manner the same is to be performed, I declare that what I claim is:—

1. A liquid flow actuated safety or indicating device comprising an inlet pipe for a fluid flow system, a weir located within said device, and a flow actuated element comprising a plate-like member arranged to be slidable in a direction substantially at right angles to the line at the top of said weir, said inlet pipe located beneath said plate-like member, said member being arranged to be normally held by the flow of liquid in said inlet pipe at the level of said top of the weir but able to move to a level below that of the weir should the flow of liquid fail, the said member being positioned in a chamber, one wall of which is constituted by the weir and of larger cross-sectional area than the plate-like member.

2. A liquid flow actuated control device comprising an enclosing chamber, a plurality of flow actuated members mounted side by side in said enclosing chamber, a plurality of inlet pipes located below each actuating member, a baffle plate arranged to act as a weir located in said enclosing chamber, said flow actuating members having an upwardly extending rod, a plurality of electrical contacts located substantially near the top of said rod, said contacts arranged to disconnect a plurality of electrical discharge devices should the liquid in said chambers fall below a predetermined level.

3. A liquid flow actuated control device comprising an enclosing chamber, a plurality of flow actuated members mounted side by side in said enclosing chamber, a plurality of inlet pipes located below each actuating member, a baffle plate arranged to act as a weir located in said enclosing chamber, said flow actuating members having an upwardly extending rod, said rod having adjustable means for actuating a plurality of electrical contacts, said electrical contacts located substantially near the top of said rod, said contacts arranged to disconnect a plurality of electrical discharge devices should the liquid in said chambers fall below a predetermined level.

4. A liquid flow actuated safety device comprising a plurality of inlet pipes for a flow-actuated system, a weir located within said device and a flow-actuated element comprising a plurality of plate-like members arranged to be slidable in a direction substantially at right angles to the line at the top of said weir, said inlet pipes located beneath said plate-like members, said members being normally arranged to be held by the flow of said liquid in said inlet pipes at the level of the top of said weir but able to move to a level below that of the weir should the flow of liquid fail, the said members being positioned in a chamber, one wall of which is constituted by the weir and of larger cross-sectional area than the plate-like members.

5. A liquid flow actuated control device comprising an enclosing chamber, a plurality of flow actuated members mounted side by side in said enclosing chamber, a plurality of inlet pipes located below each actuating member, a baffle plate arranged to act as a weir located in said enclosing chamber, said flow actuating members having an upwardly extending rod, said rod having an inclined lower face, adjustable means for actuating a plurality of electrical contacts, said electrical contacts located substantially near the top of said rod, said contacts arranged to disconnect a plurality of electrical discharge devices should the liquid in said chamber fall below a predetermined level.

HARRY ALEXANDER EWEN.